June 6, 1944. M. RETTINGER 2,350,820
AIRCRAFT ALTITUDE DETERMINING SYSTEM
Filed Aug. 10, 1942 2 Sheets-Sheet 1

MICHAEL RETTINGER,
INVENTOR.

BY

ATTORNEY.

June 6, 1944.  M. RETTINGER  2,350,820
AIRCRAFT ALTITUDE DETERMINING SYSTEM
Filed Aug. 10, 1942   2 Sheets-Sheet 2
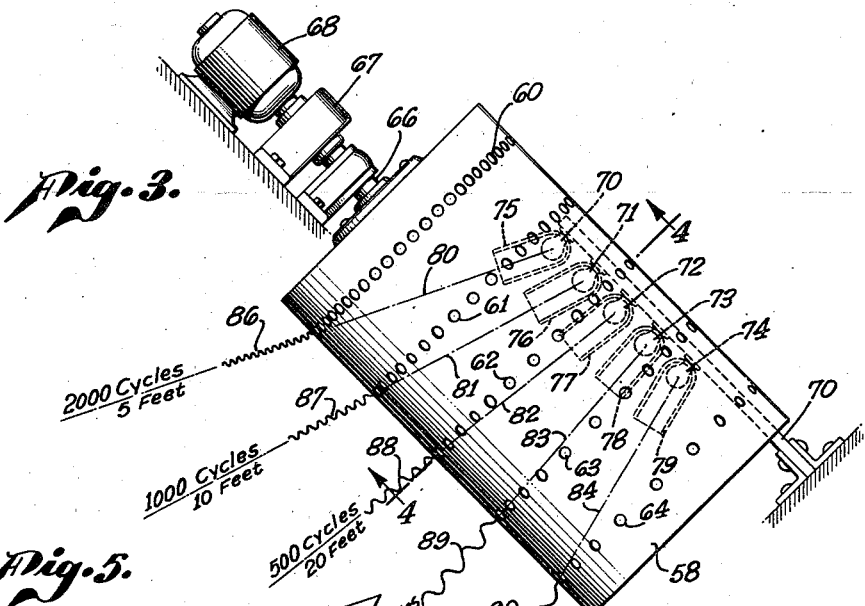
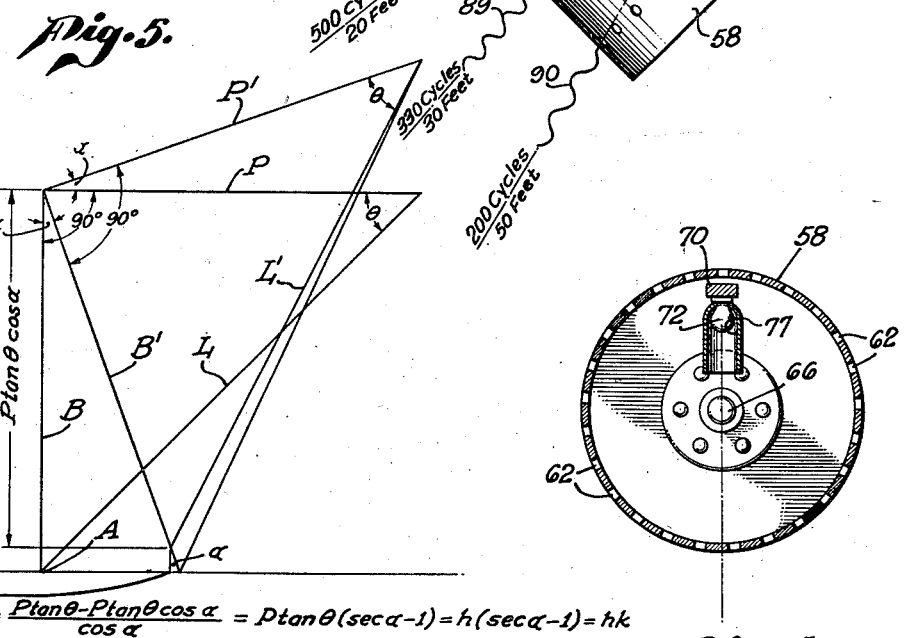
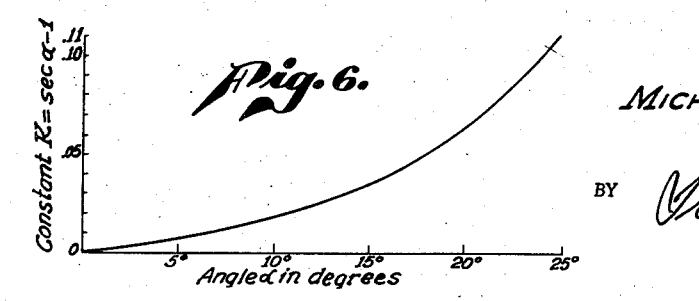
MICHAEL RETTINGER,
INVENTOR.
BY
ATTORNEY.

Patented June 6, 1944

2,350,820

UNITED STATES PATENT OFFICE 2,350,820

AIRCRAFT ALTITUDE DETERMINING SYSTEM

Michael Rettinger, Encino, Calif., assignor to Radio Corporation of America, a corporation of Delaware Application August 10, 1942, Serial No. 454,220

12 Claims. (Cl. 250—1)

This invention relates to aircraft pilot guiding systems and particularly to a method of and means for providing a pilot with accurate audible indications of his distance above ground or water while landing.

Altimeters of many types are well-known in the art wherein a radio or light beam is projected to the earth and reflected back to the plane to indicate altitude. Many of these prior systems, although satisfactory at the higher altitudes, do not provide an accurate indication of distances within fifty feet of the earth. The present invention is particularly suitable for the training of the pilots in the landing of aircraft, wherein the pilot is apprised by an audible signal of his exact distance above the landing field, during the landing of his plane. Indications of distances such as 5, 10 and 15 feet above the earth are audibly provided so that the pilot can correlate his visual and aural observations, and thus increase his ability to land safely. The invention also minimizes poor landings during the pilot's training period.

The apparatus is based on a light-reflecting system and may be embodied in two forms, either of which produces audible signals easily interpreted into accurate low altitudes.

The principal object of the invention, therefore, is to provide improved means for the training of aircraft pilots in landing aircraft.

Another object of the invention is to provide an improved accurate audible altimeter for low altitudes.

A further object of the invention is to provide an improved system for indicating audibly low altitudes to a pilot during landing of his aircraft in complete darkness.

A further object of the invention is to provide an improved altimeter utilizing reflected light, which provides audible signals indicative of the height of aircraft above ground or water.

Although the novel features which are believed to be characteristic of this invention are pointed out with particularity in the claims appended herewith, the manner of its organization and the mode of its operation will be better understood by referring to the following description, read in conjunction with the accompanying drawings, in which:

Fig. 3 is a detailed view of the light chopper employed in the embodiment shown in Fig. 2;

Fig. 4 is a cross-sectional view of the light chopper of Fig. 3 taken along line 4—4 thereof, and, Figs. 5 and 6 are a diagram and graph, respectively, indicating the operation of the system when the aircraft is at an angle with respect to the earth.

Figure 1:
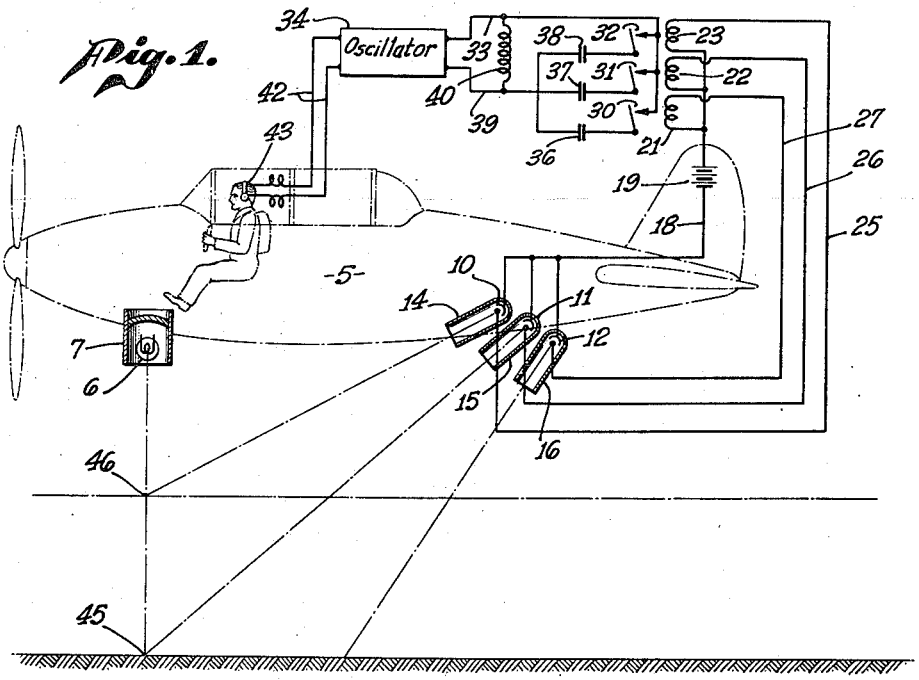
Fig. 1 is a diagrammatic arrangement of one embodiment of the invention.

Referring now to Fig. 1, an aircraft in the form of an airplane 5 has mounted near the front end thereof a light source 6 located within a tubular reflector 7 for projecting the light beam to the earth. Positioned near the tail of the airplane are shown three photoelectric cells 10, 11 and 12 contained within respective tubular light-isolating members 14, 15 and 16. Although only three of these pick-up elements are illustrated, it will be understood that more may be employed in the same manner as the three to be described.

A common conductor 18, having therein a source of energy such as a battery 19, connects photoelectric cells 10, 11 and 12 to a terminal of each of the solenoid relay windings 21, 22 and 23, relay winding 23 being connected over conductor 25 to photoelectric cell 10, relay winding 22 being connected over conductor 26 to photoelectric cell 11, and relay winding 21 being connected over conductor 27 to photoelectric cell 12. The relays 21, 22 and 23 when energized will close respective contacts 30, 31 and 32 which are connected over a common connector 33 to an oscillator 34. Over individual conductors the contacts 30, 31 and 32 connect any one of respective condensers 36, 37 and 38 to the oscillator 34 over conductor 39. The closing of contact 30 will tune the oscillator 34 to one certain frequency, the closing of contact 31 will tune the oscillator 34 to another frequency, while the closing of contact 32 will tune the oscillator 34 to a third frequency, the condensers 36, 37 and 38 cooperating with the coil 40 for this purpose. The output of the oscillator is connected over conductors 42 to a pair of headphones 43 worn by the pilot. Although the elements first described are shown outside the plane for the sake of clearness, it is to be understood that they are of a size to be easily carried within the plane.

In operating the above system, the beam of light from the lamp 6 will strike the earth at a point 45 when the plane is at the altitude shown in Fig. 1 and at this height, the photoelectric cell 11 will pick up the light from the source 6 reflected in the direction of the cell. The light on cell 11 will cause energization of relay 22 which will close its contact 31, thus connecting condenser 37 in the oscillator frequency determining circuit, The oscillator 34 will thus supply a definite frequency to the earphones 43, and the operator will be made aware of his altitude above ground since that definite frequency represents a certain altitude. Should the plane 5 be at an altitude wherein the beam of light strikes the earth at point 46, the photoelectric cell 10 will be energized and a different frequency impressed on the earphones 43, indicating this height. Thus, as the pilot brings his craft to earth, he is made aware of his exact altitude above the earth without any interference with his visual concentration on observing the ground at a distance, or other objects about him.

Figure 2:
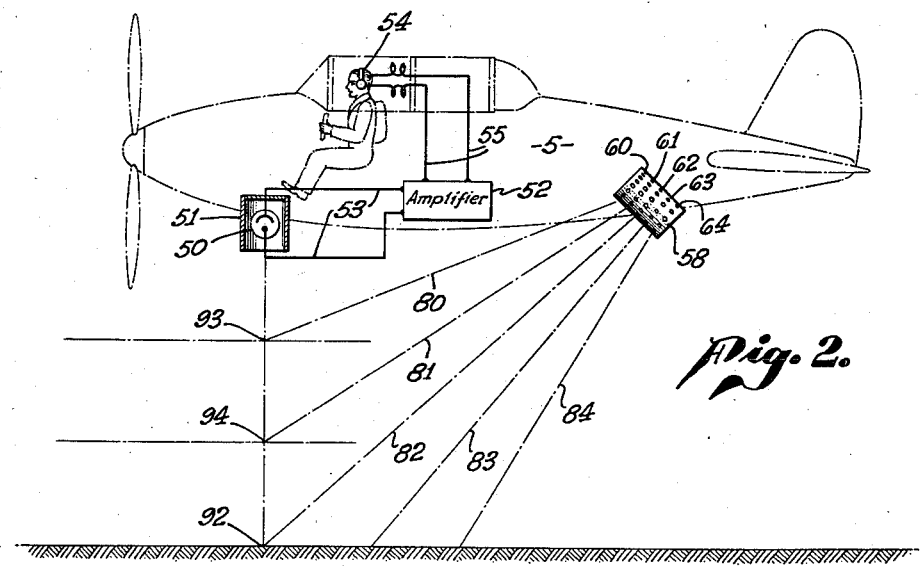
Fig. 2 is a diagrammatic arrangement of a second embodiment of the invention.

Referring now to Fig. 2, another embodiment of the invention is illustrated wherein a single photoelectric cell 50 is positioned near the nose of the plane similarly to the source of light 6 in Fig. 1, the cell 50 being enclosed in a tubular member 51 for better functioning of the cell. The output of the cell 50 is connected to an amplifier 52 over conductors 53, the amplifier output being directly connected to earphones 54 over conductors 55. Thus, the electrical portion of the system of Fig. 2 is simplified in comparison with that of Fig. 1 in that it requires solely a single photoelectric cell, a simpler amplifier and earphones. However, to produce the source of light, a rotatable cylinder 58 is positioned in the tail of the plane, the cylinder having an axis inclined at approximately 45 degrees to the horizontal. This cylinder has a plurality of circumferentially-arranged rows of holes, such as shown in Fig. 3 at 60, 61, 62, 63 and 64, the cylinder 58 being mounted for rotation on a shaft 66 connected through reduction gear box 67 to a motor 68. Mounted on a support 70 within the cylinder 68 is a plurality of light sources 70, 71, 72, 73 and 74 around which are respective tubular reflectors 75, 76, 77, 78 and 79.

In operation light from the lamp 70 is projected as a beam by the reflector 75 through the row of holes 60 at a definite angle with respect to the horizontal of the plane, as shown by the center ray line 80. Similarly lamps 71, 72, 73 and 74 project beams of light through the respective rows of holes 61, 62, 63 and 64 as shown by the respective light ray lines 81, 82, 83 and 84. As the holes in the different rows are spaced differently circumferentially on the cylinder 58, each light beam will be interrupted at a different rate, so that the light beam being projected through the holes 60 will have a much higher rate of interruption than the light beam through the holes 64. These various rates of interruption are approximately designated by the sine wave representations 86, 87, 88, 89 and 90.

For instance, the number of holes in the row 60 and the R. P. M. of the cylinder 58 may provide an impulse frequency of 2,000 cycles per second; the number of holes in row 61 may produce an impulse frequency of 1,000 cycles per second; the number of holes in row 62 may produce an impulse frequency of 500 cycles per second; the number of holes in row 63 may produce an impulse frequency of 330 cycles per second, while the number of holes in row 64 will produce a light interruption of 200 cycles per second. Now by arrangement of the angle of projection of each of the respective light beams, the 2,000 cycle frequency may be made to correspond to an altitude of five feet; the 1,000 cycle frequency correspond to an altitude of 10 feet; the 500 cycle frequency correspond to an altitude of 20 feet; the 330 cycle correspond to an altitude of 30 feet; and the 200 cycle frequency correspond to an altitude of 50 feet. These frequencies are easily distinguishable from each other when reproduced.

Referring now to Fig. 2, and assuming the altitude shown therein, the light beam from lamp 72 will strike the earth at the point 92 and will be picked up by photoelectric cell 50. Because of the alternating nature of the cell output, this current will be efficiently amplified in amplifier 52 and transmitted to the pilot's earphones 54 to indicate that his plane is 20 feet above the earth. When the light ray 81 strikes the earth at a point 94 so as to be detected by the photoelectric cell 50, the pilot is made aware that he is 10 feet above the earth, while the light beam 80 striking the earth at point 93 will indicate to the pilot that he is only five feet above the earth. Similarly, when light rays 83 and 84 are picked up by the photoelectric cell 50 the plane will be 30 and 50 feet respectively above the earth. Thus, the pilot in bringing his plane to a landing, is readily apprised of his altitude above the earth, and if he notes that he is landing at too steep an angle, may readily straighten the flight of his plane to bring his ship down at the proper landing angle.

It is realized that student pilots may not always maintain their planes with the plane wings in a horizontal position when approaching the landing field, and although it is possible to mount the light sources and pick up cells so that they would always have a constant relationship with respect to a horizontal, this type of mounting introduces a complexity which is unnecessary. By fixedly positioning the light sources and pick-up cell in the plane a slight error is introduced when the axis of the plane is not parallel with the surface of the ground. However, the degree of this error is so small as to be negligible as is shown in Figs. 5 and 6. The line P represents the horizontal axis of the plane and is the reference line about which the photoelectric cell and light sources are oriented. With the plane in a position so that its axis corresponds with line P, the light source will project the beam L to a point A which will be detected by the cell along the axis B and the correct altitude will be obtained. However, with the plane descending so that its axis corresponds with the line P' the axis P' will make the angle $\alpha$ with the line P. Thus, the line B becomes shifted to position B' and the line L to L' and the reading obtained will be in error by the distance $d$. Mathematically the distance $d$ is equal to $$\frac{P \tan \theta - P \tan \theta \cos \alpha}{\cos \alpha}$$

which when simplified equals the height $h$ of the plane above ground, multiplied by a constant $k$, which is equal to sec $\alpha - 1$. The value of the corresponding factor $k$ is shown by Fig. 6 plotted against the angle $\alpha$, which is the angle of tilt of the plane away from the horizontal. By reference to Fig. 6 it is to be noted that for a 10° angle of tilt, which approaches the maximum, that the correcting factor $k$ is approximately .02, which when multiplied by a distance of 10 feet, means an error of approximately 2.4 inches, which may be neglected. Thus, the light sources and pick up photoelectric cells may be fixedly positioned in the plane without introducing any appreciable error.

I claim as my invention:

1. An altimeter comprising a source of light fixed with respect to the axis of an aircraft, means for directing said light as a beam, means for detecting said light beam at a certain position along said beam, said means being fixed with respect to said axis, said light beam being projected at a fixed predetermined angle with respect to said axis and detected by said detecting means at a fixed predetermined angle with respect to said axis, means for generating an electrical current of a predetermined frequency when said detecting means is activated, and means connected to said detecting means for audibly reproducing said electrical current at said predetermined constant frequency.

2. An altimeter in accordance with claim 1 in which said last-mentioned means is an electrical oscillator tuned to said predetermined frequency by the output of said detecting means.

3. An altimeter in accordance with claim 1 in which said last-mentioned means is a light chopper for interrupting said light beam at said predetermined frequency.

4. An altimeter comprising a source of light, means for directing said light as a beam toward the earth, a plurality of means for detecting said beam at its point of contact with the earth, means for generating an electrical current of different frequencies, means connected to said light detecting means for controlling the frequency of generation of said electrical current in accordance with the particular detecting means energized by the light beam at the point of contact of said beam with the earth, and means for audibly reproducing said frequencies.

5. An altimeter in accordance with claim 4 in which said frequency generating means comprises an electrical oscillator and said frequency controlling means includes a plurality of tuned circuits and a respective plurality of relays, the latter being energized in accordance with the particular detecting means energized.

6. An altimeter comprising means for generating a plurality of light beams, means for directing said light beams at varying angles towards the earth, means for interrupting each of said beams at a different rate, means for detecting said beams at certain points of contact thereof with the earth, and means for audibly reproducing the output of said detecting means.

7. An altimeter in accordance with claim 6 in which said means for interrupting said light beams at different rates comprises a perforated, rotatable cylinder through which said light beams are projected, the perforations interrupting each of said light beams varying in number.

8. An altimeter for audibly indicating the distance of an airplane above the earth as the airplane approaches a landing field, comprising means for generating a plurality of light beams directed at different angles with respect to an axis of the airplane, means for detecting said beams in a line normal to the axis of said plane, common means for interrupting all of said light beams simultaneously, said common means interrupting each of said light beams at a different rate, and means for audibly reproducing the output of said light detecting means.

9. An altimeter in accordance with claim 8 in which said light interrupting means comprises a rotatable cylindrical element having rows of perforations therein, the number of perforations being graduated to provide different rates of interruption of the various light beams.

10. An altimeter comprising a source of light fixed with respect to the axis of an aircraft, means for directing said light as a beam toward the earth at a constant angle with respect to the axis of said aircraft, a light sensitive means for detecting said beam at its point of contact with the earth, said means being fixed with respect to the axis of said aircraft for detecting light at a predetermined angle with respect to the axis of said aircraft, means for generating an electrical current of a predetermined frequency when said light beam is detected by said detecting means, and means for audibly reproducing said electrical current.

11. An altimeter in accordance with claim 10 in which a plurality of said detecting means are provided, each detecting means being fixed with respect to the axis of said aircraft for detecting light at different angles with respect to the axis of said aircraft.

12. An altimeter in accordance with claim 10 in which a plurality of said light sources are provided, each light source being fixed with respect to the axis of said aircraft for directing light at different angles with respect to the axis of said aircraft.

MICHAEL RETTINGER.